(12) United States Patent
Günther et al.

(10) Patent No.: US 7,599,903 B2
(45) Date of Patent: Oct. 6, 2009

(54) SYSTEMS AND METHODS FOR EXTRACTING DATA SETS FROM AN ONLINE RELATIONAL DATABASE INTO A DATA WAREHOUSE

(75) Inventors: Christian Günther, Mannheim (DE); Michael Aakolk, Wiesloch (DE); Jochen Kountz, Hockenheim (DE); Nuran Adal, Istanbul-Bostanci (TR)

(73) Assignee: SAP AG, Walldorf (DE)

( * ) Notice: Subject to any disclaimer, the term of this patent is extended or adjusted under 35 U.S.C. 154(b) by 581 days.

(21) Appl. No.: 10/891,521

(22) Filed: Jul. 15, 2004

(65) Prior Publication Data

US 2005/0065944 A1    Mar. 24, 2005

(30) Foreign Application Priority Data

Jul. 22, 2003    (EP) .................................. 03016500

(51) Int. Cl.
    *G06F 17/00*    (2006.01)
(52) U.S. Cl. ................................ 707/1; 707/9; 707/100; 707/200; 709/224
(58) Field of Classification Search .................... None
    See application file for complete search history.

(56) References Cited

U.S. PATENT DOCUMENTS 6,125,368 A      9/2000  Bridge et al.
6,895,471 B1 *   5/2005  Tse et al. .................... 711/118
7,035,922 B2 *   4/2006  Parham ....................... 709/224
2002/0140729 A1 * 10/2002 Price et al. .................. 345/749
2004/0236746 A1 * 11/2004 Lomet ........................... 707/9
2007/0136330 A1 *  6/2007 Lecheler-Moore et al. .. 707/100

OTHER PUBLICATIONS

Prabhu Ram et al., "Extracting Delta for Incremental Data Warehouse Maintenance," Data Engineering, 2000. Proceedings 16th International Conference, San Diego, CA, Feb. 29-Mar. 3, 2000, Los Alamitos, CA, IEEE Computer Soc. , Feb. 29, 2000, pp. 220-229.
David L. Mills, "Internet Time Synchronization: The Network Time Protocol," IEEE Transactions on Communications, vol. 39, No. 10, Oct. 1, 1991, pp. 1482-1493.
PCT International Search Report and Written Opinion, dated Feb. 21, 2005, 14 pages.

* cited by examiner

*Primary Examiner*—Charles Rones
*Assistant Examiner*—Belix M Ortiz
(74) *Attorney, Agent, or Firm*—Finnegan, Henderson, Farabow, Garrett & Dunner, LLP

(57) ABSTRACT

Systems and methods are provided for extracting data sets from an online relational database into a data warehouse. A data query based on special timestamping technique is executed. Timestamping allows extraction of only these data sets that have changed since the last extraction point. The data sets that have been already imported stay unchanged and do not need to be deleted at the time of the new import. Extraction interval of data sets including a time window enclosed by lower and upper limits is defined. The extracted data sets that have been imported twice may be filtered out with the use of, for example, an operational data store (ODS) objects. The filtered out data sets may be available in the data warehouse for the drilldown reporting.

23 Claims, 5 Drawing Sheets

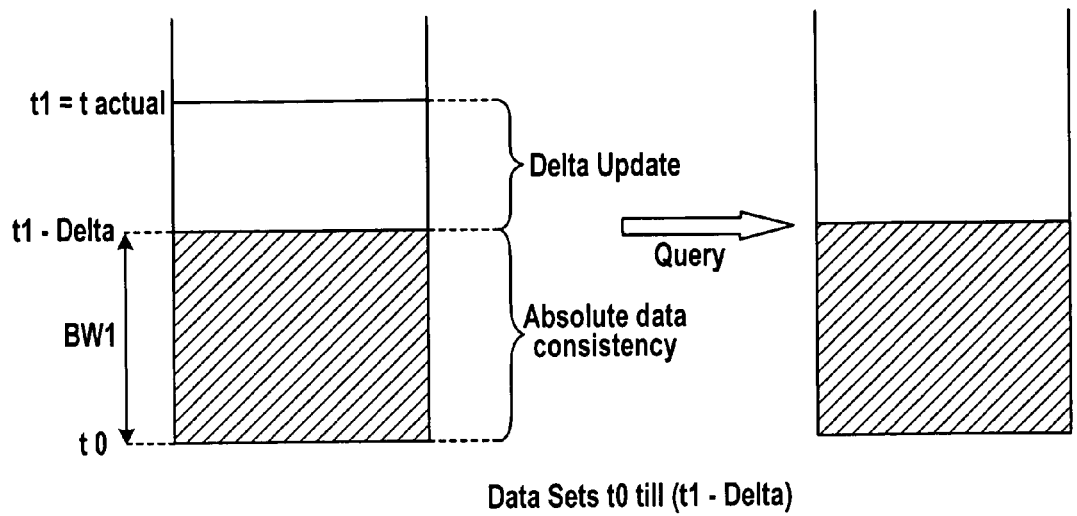
Data Sets t0 till (t1 - Delta)
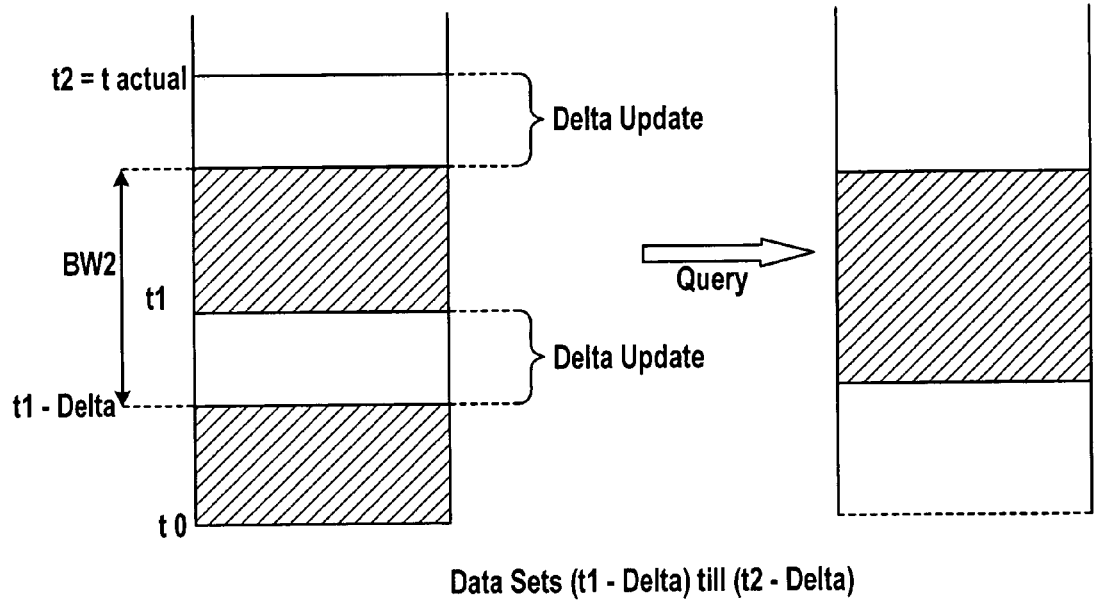
Data Sets (t1 - Delta) till (t2 - Delta)
FIG. 3

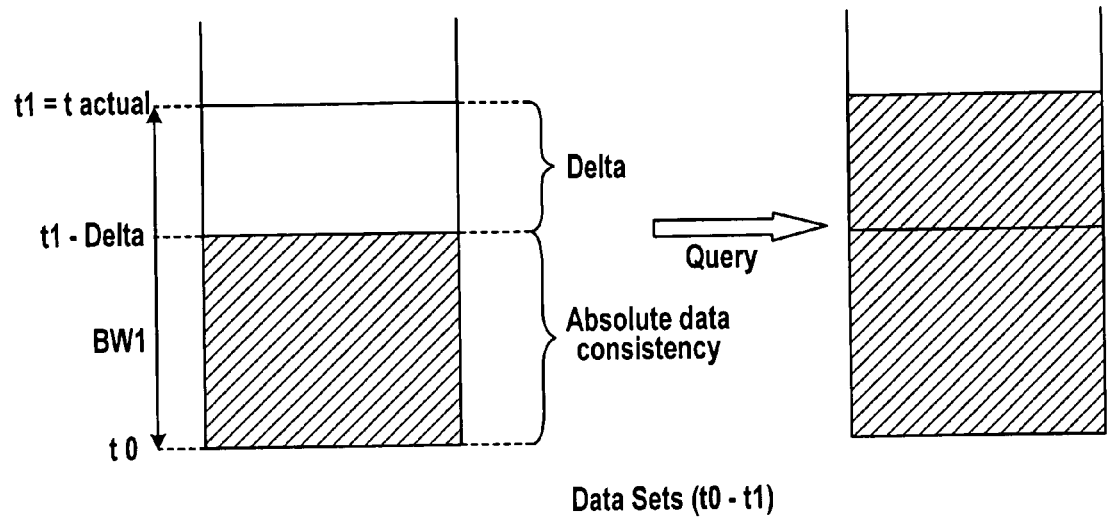
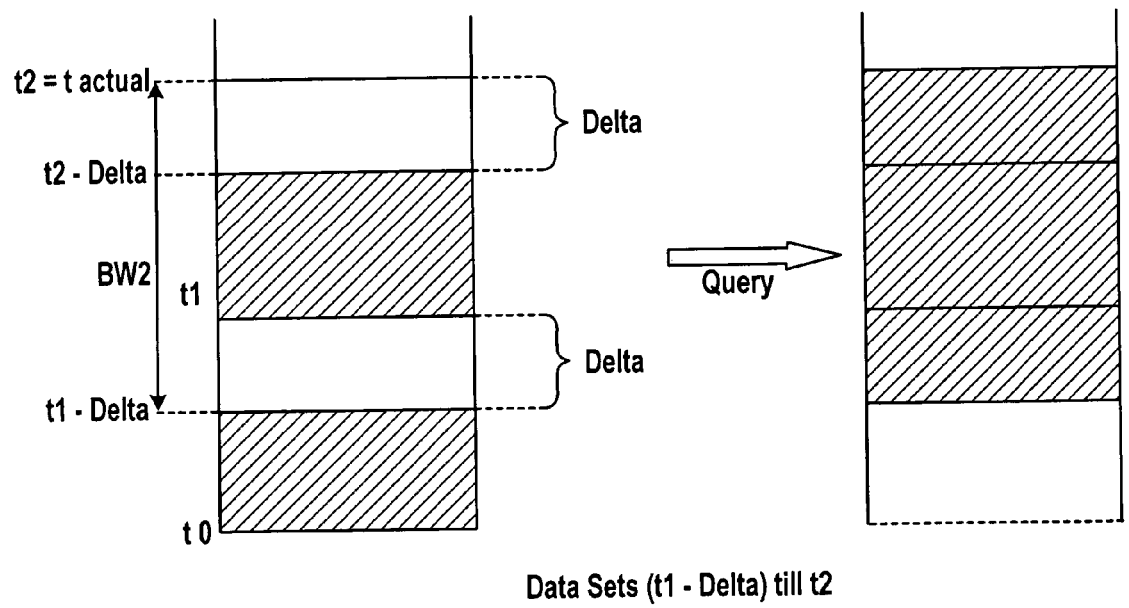
FIG. 4

SYSTEMS AND METHODS FOR EXTRACTING DATA SETS FROM AN ONLINE RELATIONAL DATABASE INTO A DATA WAREHOUSE

DESCRIPTION

1. Field

The present invention generally relates to data extraction techniques and, more particularly, to methods and systems for providing data sets to a data warehouse.

2. Background

Enterprise database systems can be divided into two categories: operational and informational. Operational databases function as repositories for data produced by online transaction processing systems of the manufacturing, production, and transactional systems. On the other hand, informational databases store data periodically extracted from operational databases for use in decision support and information processing systems. Informational databases include data warehouses.

Data warehouses, like for example the SAP Business Warehouse (BW), were designed and developed as a solution to problems of users submitting queries directly, slowing down the performance of online transaction processing systems which require a minimum guaranteed response time with uninterrupted availability and jeopardizing important production system functions. This, along with the risks associated with giving the extended e-business enterprise direct access to online transaction processing systems, constituted an urgent necessity to store data in an environment that is not only optimized for business analysis and reporting, but also for secure broad access. Thus, creation of data warehouses made it possible for users to query the separate data warehouse database without impacting the operational databases.

In known systems, however, data warehouses were updated by periodically copying the entire database of the online transaction processing system. Such approaches were quite lengthy and caused substantial data duplication. Moreover, in the prior systems, the source data had to undergo extensive aggregation as it was transferred to the warehouse and the information was only available for analysis in the summarized form, not allowing for the investigation on the level of single items.

Systems and methods consistent with the present invention can overcome these problems by updating the data warehouse with short, frequent queries, since only the data sets that have changed since the last extraction point are imported. The data sets that have been already imported stay unchanged and do not need to be deleted at the time of the new import. The new updates are no longer as time consuming as the entire database replication and extensive duplication of data is avoided. Moreover, systems and methods consistent with the present invention enable analysis of single budget items and reporting in the data warehouse. Thus, there is no longer a limit of only the summarized data being available in the data warehouse, but all of the single item data can be loaded into the data warehouse with the help of views.

A data warehouse for the first time in budgeting can mirror the online transaction processing system in the level of detail available, allowing managers to quickly analyze the underlying causes of budget irregularities by using so called drilldown reporting and not only the aggregate data as it was the case in prior approaches. This has advantages because, for example, a budget is often binding and if changes in the budget cannot be analyzed in detail as soon as they are introduced and appropriate actions are not taken, this may result in considerable costs overruns later in the project.

SUMMARY

Consistent with the present invention, systems and methods are provided for updating a data warehouse database with data retrieved from an online relational database by executing a query of source data to obtain a subset of the data sets having predetermined timestamps. The timestamping of the data sets allows extraction of only those data sets that have changed since the last extraction point. The data sets that have been already imported stay unchanged and do not need to be deleted at the time of the new import. Thus, the copying of the entire database is avoided.

Nevertheless, in order to prevent any data from being omitted during the extraction process a time window may be determined. Lower and upper limits of the time window for extraction of data sets may be defined in such a way that a first reference time is a lower limit, the first reference time being the time of the previous database query (t1) minus a time interval (delta). Further, an upper limit of the extraction time window may depend on the embodiment or implementation. In one embodiment, the upper limit is equal to an actual system time when a query is performed. In another embodiment, the upper limit is equal to an actual system time minus a time interval (delta). In any case, the time window that assures not omitting any data sets during the extraction process must be sufficiently large that all data sets which that have received a timestamp at the time of the last extraction but were not imported yet, can be included in the most recent extraction.

Timestamped data sets may be stored in an online relational database. Subsets of data sets retrieved from the online relational database of the OLTP system are then sent to data warehouse where duplicate subsets may be filtered out with the use of ODS objects, if necessary, and subsets of informational data may be analyzed by the user on the level of the single items using, for example, drilldown reporting.

The accompanying drawings, which are incorporated in and constitute a part of this specification, illustrate several embodiments and together with the description, serve to explain the principles of the present invention.

BRIEF DESCRIPTION OF THE DRAWINGS

FIG. 3 is a diagram showing an embodiment consistent with the present invention in which data warehouse queries are executed to obtain a subset of the data sets having predetermined timestamps;

FIG. 4 is a diagram showing an embodiment consistent with the present invention in which data warehouse data queries are executed to obtain a subset of the data sets having predetermined timestamps plus a time window.

DESCRIPTION OF THE EMBODIMENTS

Figure 1:
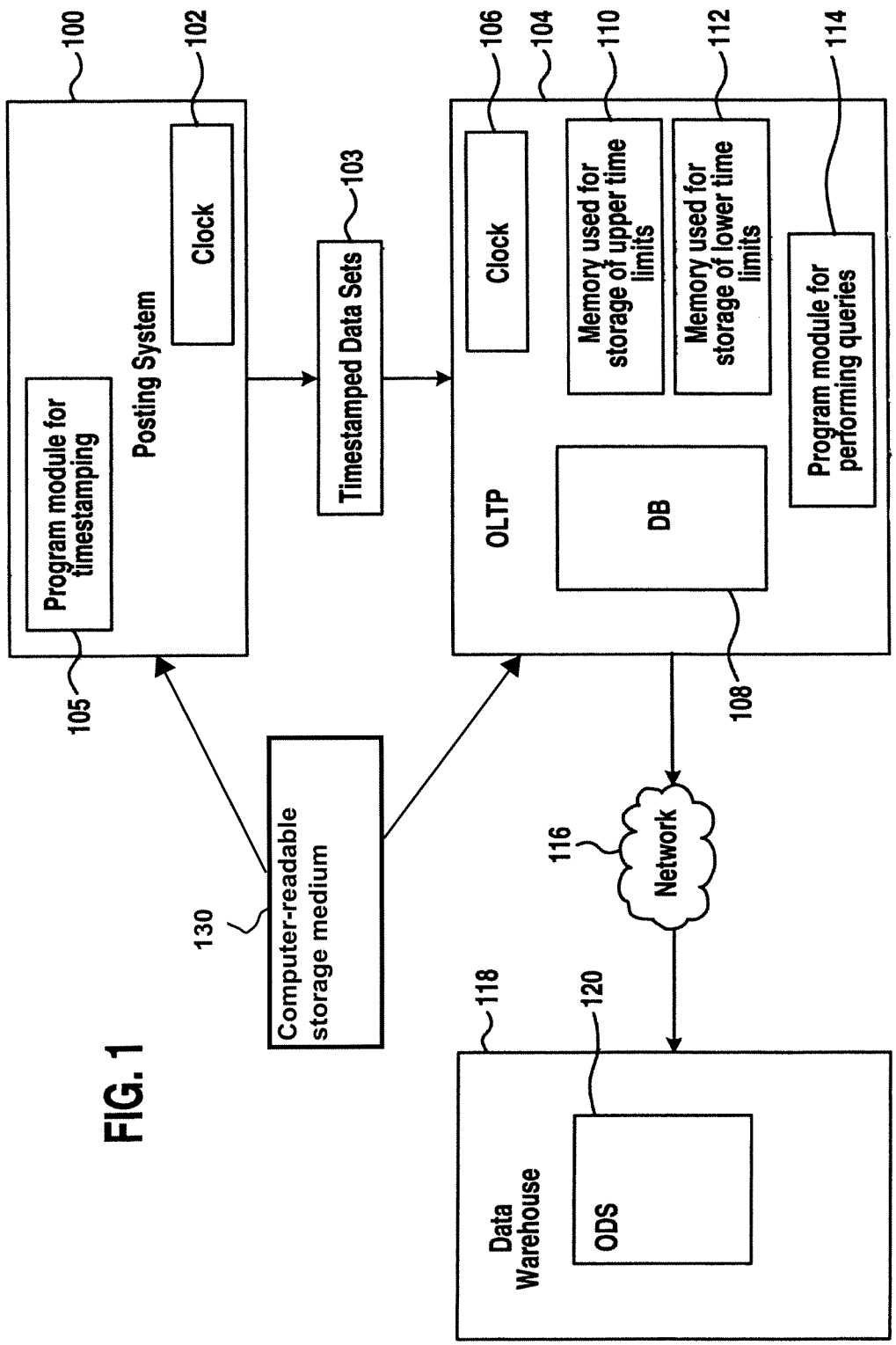
FIG. 1 is a block diagram showing an exemplary multitiered database architecture consistent with the present invention.

FIG. 1 illustrates a block diagram showing an exemplary system for providing data sets to a data warehouse. As shown, the system may comprise a posting system 100 with a timestamping component 105 using an internal clock 102 of the posting system for timestamping data sets being entered in the posting system. Timestamped data sets 103 may be stored in an online relational database 108 of an online transaction processing system (OLTP) system 104. The online relational database 108 may comprise one or more tables (not shown) each configured to store a plurality of data sets. The posting system 100 includes a computer-readable storage medium 130, which is connected to the timestamping component 105 and the online relational database 108 and is configured to store code for performing the methods described herein for providing data sets to a data warehouse. The posting system's internal clock 102 is synchronized with the online transaction processing system's master clock 106 in order to make sure that that the data sets receive a correct timestamp. In one embodiment, posting system 100 may be an integral part of OLTP system 104.

A timestamp of a data set may be a seven-part value that includes a CPU-date and a CPU-time expressed in, for example, years, months, days, hours, minutes, seconds, and microseconds. However, the timestamp may also use the form of CPU-date. In this case, the CPU-date stamp can be found in the header of the budget single item. Since a time interval (delta) is equal to or greater than a maximum latency time between time stamping and storage in the database, different time windows can be used in order to prevent any data sets from being omitted during extraction.

In any case, the time window that assures not omitting any data sets during the extraction process must be sufficiently large to include, in the most recent extraction, all the data sets which have received a timestamp at the time of the last extraction but were not yet imported. In one embodiment, only those data sets which were booked a certain safety time interval before the start of the extraction may be selected for actual extraction, in order to avoid extracting the data sets for which posting is ongoing. Further, hardware characteristics must be taken into account for selecting a size of the time window for the extraction. CPU-date stamping, for example, represents the considerable time window because there may be a built-in one day overlap, for safety.

Data sets that have received a timestamp may then be stored in an online relational database 108 of the online transaction processing system. Then, program module 114 performs data query of online relational database 108 at a predefined time interval or in response to receipt of a request from data warehouse 118. A lower limit of the extraction time window 112 may be defined as a first reference time, the first reference time being the time of the previous database query (t1) minus a time interval (delta). An upper limit of the extraction time window 110 may be equal to an actual system time when a query is performed, or may be equal to an actual system time minus a time interval (delta).

The data extractors consist of multiple programs, designed to extract from the OLTP system the data sets in such a way that the data traffic will be limited to a minimum between the source system and the data warehouse. Network 116 that interconnects the OLTP system 104 and the data warehouse 118 may allow the data traffic between the OLTP and data warehouse in the form of packets via Application Link Enabling (ALE) that makes possible message based integration between different applications. By using ALE, one can connect the applications regardless of the platforms used, where SAP R/2 and R/3 can easily cooperate with other external systems.

The extracted data sets may be saved in the data warehouse in the operational data store (ODS) objects 120. This enables the system at the later time to filter out data sets that have been transferred twice and to assure the transfer of the latest data.

Figure 2:
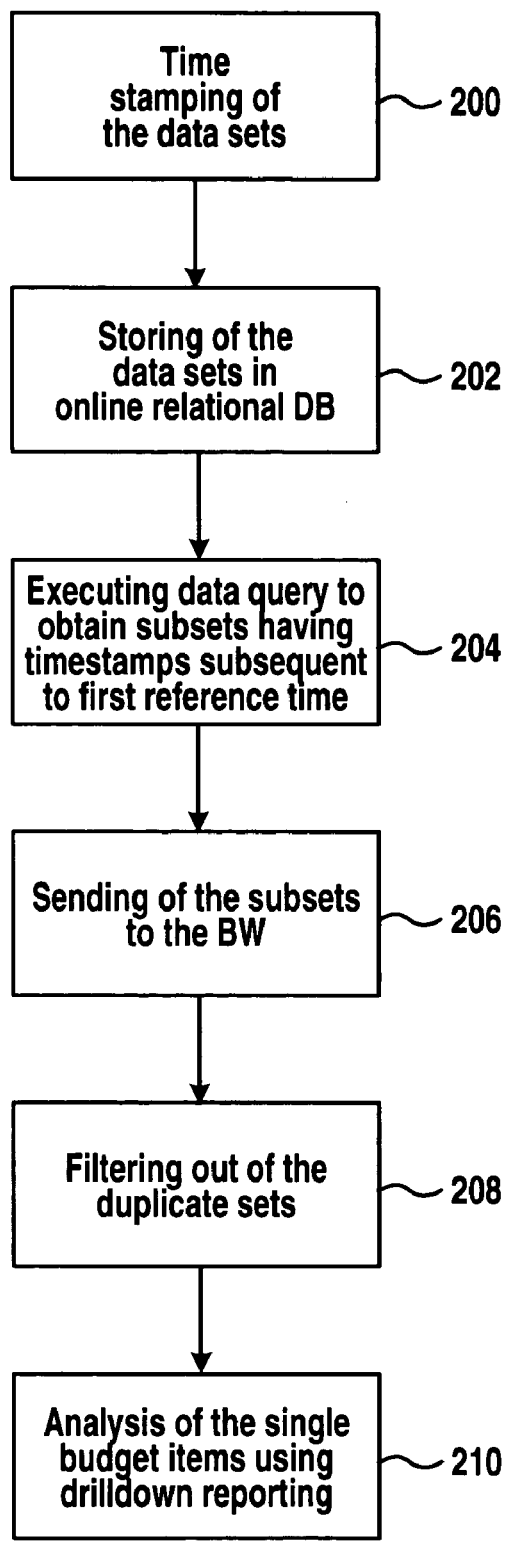
FIG. 2 is a flow chart showing an exemplary method of providing data subsets to a data warehouse.

FIG. 2 is a flow chart illustrating an exemplary method of providing data subsets to a data warehouse 118. The timestamping of the data sets, stage 200, allows updating of the data warehouse database.

Timestamped data sets may be stored, stage 202, in an online relational database. Then, a query is executed, stage 204, in order to obtain a subset of the data sets having timestamps subsequent to a first reference time. This allows extraction from OLTP system's relational database of only those data sets that have changed since the last extraction point. The frequency of extraction may be manually established and/or controlled by parameters.

In stage 206, the subsets of the data sets may be sent to the data warehouse. However, the data that was already imported stays unchanged and does not need to be deleted at the time of the new import. Thus, instead of copying the entire budget database, the extraction interval of data sets can be predetermined since timestamps make it possible to recognize what data sets have been already imported. However, because of the use of the time window some portion of the subsets extracted from the data sets have been transferred twice, for this reason ODS-objects are used to filter out, stage 208, the duplicate data subsets.

In stage 210, all the filtered data sets are available for analysis in the data warehouse at the level of detail equal to the level available previously only in OLTP system. A user by pointing at any particular data in the summary will immediately see all its detail components.

FIG. 3 illustrates an embodiment in which a database query BW1 of online relational database is executed to obtain a subset of the data sets having timestamps enclosed in the extraction interval between initial time t=0 and actual system time t1 minus time interval delta. The resulting extracted data sets may be sent to the data warehouse.

Then, another consecutive database query BW2 is executed to obtain a subset of the data sets having timestamps enclosed in the extraction interval between time t1 minus time interval delta and actual system time t2 minus time interval delta. The result may be sent again to the data warehouse.

Data queries of the online relational database may be performed on a continuous basis to obtain subsets of the data sets having timestamps within a time window between a lower first reference time, i.e., the time of the previous query minus time interval delta, and an upper second reference time, i.e., the actual system time of the consecutive query minus time interval delta. The results of each data query may be sent to the data warehouse for further analysis. In this embodiment, no elimination of duplicate data sets by the data warehouse is required as the choice of the time window ensures that such duplicate data sets are not included in the database queries.

In another embodiment, as shown in FIG. 4, a data query BW1 of online relational database may be executed to obtain a subset of the data sets having timestamps enclosed in the extraction interval between initial time t zero and actual system time t1.

Next, a data query BW2 is executed to obtain a subset of the data sets having timestamps enclosed in the extraction interval between time t1 minus time interval delta and actual system time t2. The results of consecutive queries are sent to data warehouse. Also, in this embodiment extracting data sets and sending them to data warehouse, may be performed on a repeated basis.

Again, data queries of the online relational database may be performed on a continuous basis to obtain subsets of the data sets having timestamps within a time window between a lower first reference time, i.e., the time of the previous query minus time interval delta, and an upper second reference time. In contrast to the embodiment of FIG. 3, the second reference time is the actual system time of the consecutive query. It is to be noted that in this embodiment the elimination of duplicate data sets by the data warehouse is required as the time window for the query also covers a system latency time interval. This system latency time interval is covered twice by the previous query and the consecutive query in order to ensure that all data sets having a time stamp within the system latency time interval are provided to the data warehouse.

Figure 5:
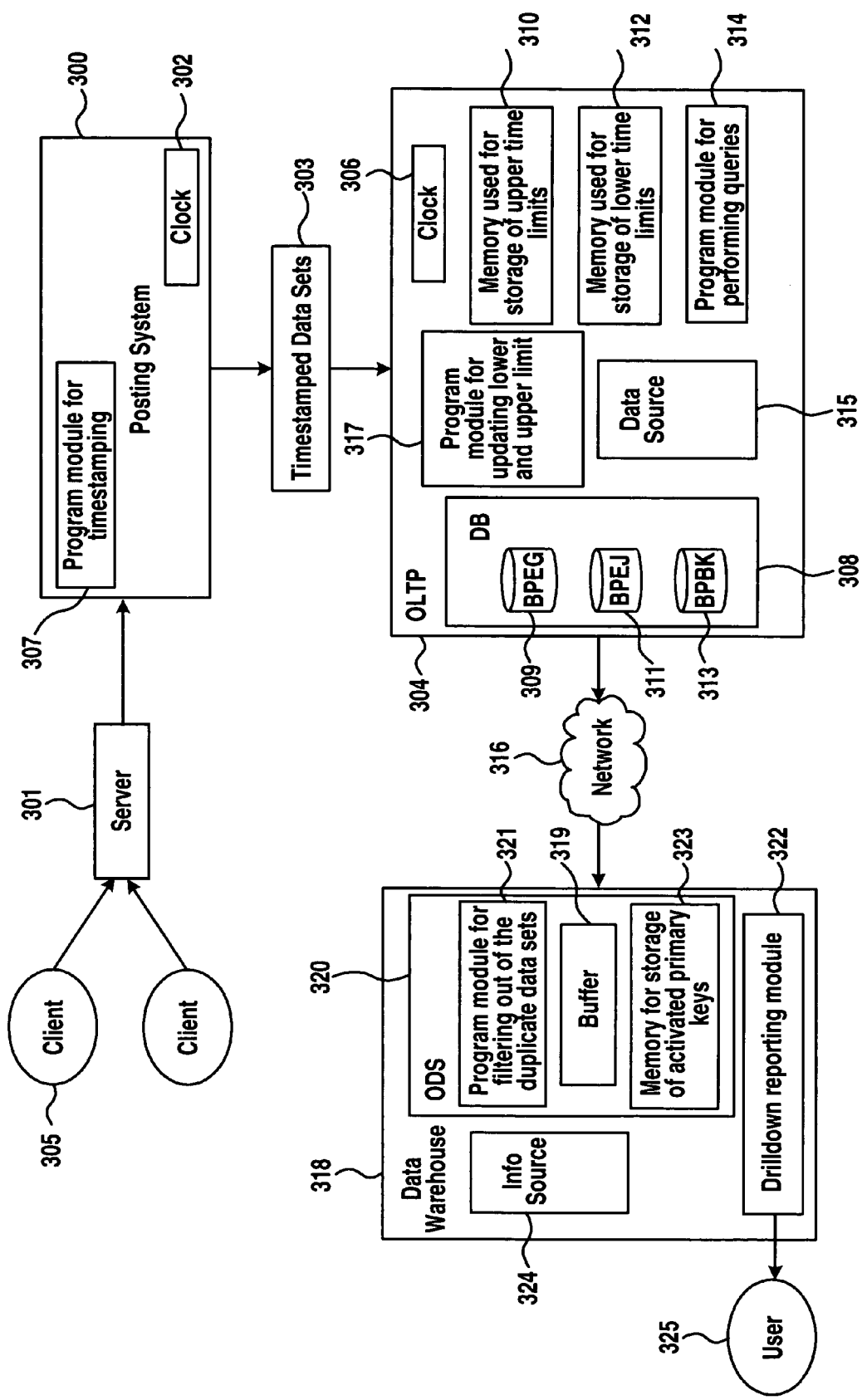
FIG. 5 is a block diagram showing an exemplary system of providing data sets to the data warehouse.

FIG. 5 is a detailed block diagram showing an exemplary system for providing data sets to the data warehouse. The embodiment of FIG. 5 is based on the embodiment of FIG. 1, with like elements being referenced by like reference numbers having added 200.

The posting system receives its data sets from R/3 server 301 being coupled to different clients 305. Then, only the data sets that have been checked for consistency are entered in the posting system to assure the data integrity.

Timestamping of the data sets is performed by the program module 307 to make it possible later in the data warehouse to recognize what data sets have been imported. A timestamp of a data set may have a seven-part value that includes a CPU-date and a CPU-time expressed in years, months, days, hours, minutes, seconds, and microseconds. SAP R/3-System, for example, logs always in each case two timestamps per data source and updating mode. Those two timestamps enclose a selection interval. In order to be able to select the data sets from the single item tables BPEG 309, BPEJ 311 and BPBK 313, data sources 315 are used in the OLTP system. Thus, all the changes in the original budget that were not included in the summarized tables may now be imported into data warehouse.

Program module 317 for updating lower and upper limits may be used in order to prevent any data sets from being omitted during the extraction process. Lower and upper limits of the time window for extraction of data sets are defined in such a way that a first reference time is a lower limit, the first reference time being the time of the previous database query (t1) minus a time interval (delta). The upper limit of the extraction time window may be equal to actual system time when a query is performed.

In another embodiment, upper limit may be equal to actual system time minus time interval (delta). In any case, the time window that assures not omitting any data sets during the extraction process must be so large that all data sets, which have received a timestamp at the time of the last extraction but were not yet imported, are included in the most recent extraction.

The extracted data sets are imported into the data warehouse where they may be temporarily stored in the buffer 319. An ODS object 320 describes a consolidated data set from one or several information sources, so called InfoSources. This data set may be evaluated using a query. An ODS object contains a key (for example, document number, position) as well as data fields that, as key figures, can also contain character fields (for example, customer). Data sets in ODS objects are stored in transparent, flat database tables.

Filtering module 321 scans and eliminates duplicate data sets contained in the subsets which have been received by the data warehouse as a result of previous and actual database query. The process of filtering out of the sets that have been imported twice is done by checking the primary keys 323 and eliminating these data sets which primary keys have been already activated. As soon as the data set with the identical primary key is found in the ODS object, the delta is calculated; if it is zero, the primary keys are identical and such data set is overwritten, thus, duplication of data in the data warehouse is avoided. In order to have access to the extracted subsets of the data sets the newly developed InfoSources 324 are used.

The filtered out data can be made available to analysts for the drilldown reporting 322. Drilldown reporting is a feature particularly important to users 325 such as managers and analysts that need reach beyond the summary information. The present invention makes this feature available for budget reporting. By pointing at any particular data in the summary, the detail components of the particular data element pointed to can be shown. Many different levels may be defined: from grand totals, the user may go to totals, partial detail, and full detail. Then, the user may go back up again to the totals. Thus, for the first time in the budget reporting the user can reach the level of detail in the analysis of the information available in the data warehouse that is equal to the level of detail available before only in the OLTP system.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer implemented method for providing data sets to a data warehouse, the method comprising:
   a) timestamping the data sets with a first computer program module on a computer;
   b) storing the timestamped data sets in an online relational database;
   c) executing a data query of the online relational database with a second computer program module to obtain a subset of the data sets having timestamps subsequent to a first reference time, the first reference time being the time of a previous database query (t1) minus a time interval (delta), wherein the time interval (delta) is equal to or greater than a maximum latency time between the timestamping and the storing in the online relational database; and
   d) sending the subsets of the data sets having timestamps subsequent to the first reference time to the data warehouse.

2. The method of claim 1, wherein timestamping is performed by a posting system.

3. The method of claim 2, further comprising receiving the data sets from a server being coupled to a plurality of clients.

4. The method of claim 3, wherein the data sets are received by the posting system, the posting system comprising one or more servers.

5. The method of claim 2, wherein only the data sets that have been checked for consistency are entered in the posting system.

6. The method of claim 1, wherein timestamping comprises determining a timestamp value by means of synchronizing a clock of the posting system with a master clock of the online relational database.

7. The method of claim 1, wherein the said method further comprises repeating steps c) and d).

8. The method of claim 1, wherein the database query is performed repeatedly at a predefined time interval or in response to receipt of a request from the data warehouse.

9. The method of claim 1, wherein the data sets are transported to the data warehouse in the form of packets via ALE (Application Link Enabling).

10. The method of claim 1, wherein the subset comprises data sets having timestamp prior to a second reference time.

11. The method of claim 10, the second reference time comprising the time of the database query (t2) minus the time interval (delta).

12. The method of claim 10, the second reference time comprising the time of the database query (t2).

13. The method of claim 12, further comprising filtering out duplicate data sets contained in the subsets which have been received by the data warehouse as a result of previous and actual database queries.

14. The method of claim 13, wherein said filtering out duplicate data sets utilizes ODS objects.

15. The method of claim 14, further comprising providing a key information to the ODS objects to assist in filtering out redundant data subsets in the data warehouse.

16. A computer system for providing data sets to a data warehouse, comprising:
- a posting system comprising an internal clock and at least one server;
- a computer;
- a timestamping component computer program module for use on the computer, the timestamping component computer program module using the internal clock for timestamping of data sets being entered in the posting system;
- an online relational database comprising one or more tables each configured to store a plurality of the timestamped data sets;
- a data query generator generating a query of the online relational database executed to obtain a subset of the data sets having timestamps subsequent to a first reference time, the first reference time being the time of the previous database query (t1) minus a time interval (delta), wherein the time interval is equal to or greater than a maximum latency time between time stamping and storage in database; and
- a network for sending the subset of the data sets having timestamps subsequent to the first reference time to the data warehouse.

17. The system of claim 16, further comprising:
- a filtering module for filtering out duplicate subsets using ODS objects; and
- a data warehouse database comprising one or more tables each configured to store a plurality of subsets of informational data for analysis using drilldown reporting.

18. The system of claim 16, wherein the online relational database synchronizes the internal clock of the posting system and a master clock of an online transaction processing system.

19. The system of claim 16, further comprising a buffer for temporary storage of extracted subsets, ODS objects, and primary keys of data subsets for filtering out duplicate data sets.

20. The system of claim 16, the subset comprising data sets having timestamp prior to a second reference time.

21. The system of claim 20, the second reference time comprising the time of the database query minus (t2) minus the time interval (delta).

22. The system of claim 20, the second reference time comprising the time of the database query (t2).

23. A computer-readable storage medium holding code for performing the method of claim 1.

* * * * *

UNITED STATES PATENT AND TRADEMARK OFFICE
CERTIFICATE OF CORRECTION

PATENT NO. : 7,599,903 B2  Page 1 of 1
APPLICATION NO. : 10/891521
DATED : October 6, 2009
INVENTOR(S) : Günther et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 749 days.

Signed and Sealed this

Twenty-eighth Day of September, 2010

David J. Kappos
*Director of the United States Patent and Trademark Office*